(12) United States Patent
Chen

(10) Patent No.: US 8,804,504 B1
(45) Date of Patent: Aug. 12, 2014

(54) SYSTEM AND METHOD FOR REDUCING CPU LOAD IN PROCESSING PPP PACKETS ON A SSL-VPN TUNNELING DEVICE

(75) Inventor: Jonathan Chen, Santa Clara, CA (US)

(73) Assignee: F5 Networks, Inc., Seattle, WA (US)

( * ) Notice: Subject to any disclaimer, the term of this patent is extended or adjusted under 35 U.S.C. 154(b) by 197 days.

(21) Appl. No.: 13/234,797

(22) Filed: Sep. 16, 2011

Related U.S. Application Data

(60) Provisional application No. 61/383,700, filed on Sep. 16, 2010.

(51) Int. Cl.
  *H04L 12/26* (2006.01)
  *H04L 29/08* (2006.01)

(52) U.S. Cl.
  CPC .................................. *H04L 69/324* (2013.01)
  USPC ........................................................ 370/229

(58) Field of Classification Search
  CPC .................................................. H04L 69/324
  USPC ......... 370/229–231, 235, 351, 389, 431, 464, 370/465; 709/227–229, 238, 246
  See application file for complete search history.

(56) References Cited

U.S. PATENT DOCUMENTS

| | | | |
|---|---|---|---|
| 3,950,735 | A | 4/1976 | Patel |
| 4,644,532 | A | 2/1987 | George et al. |
| 4,897,781 | A | 1/1990 | Chang et al. |
| 4,965,772 | A | 10/1990 | Daniel et al. |
| 5,023,826 | A | 6/1991 | Patel |
| 5,053,953 | A | 10/1991 | Patel |
| 5,299,312 | A | 3/1994 | Rocco, Jr. |
| 5,327,529 | A | 7/1994 | Fults et al. |
| 5,367,635 | A | 11/1994 | Bauer et al. |
| 5,371,852 | A | 12/1994 | Attanasio et al. |
| 5,406,502 | A | 4/1995 | Haramaty et al. |

(Continued)

FOREIGN PATENT DOCUMENTS

| | | |
|---|---|---|
| EP | 0744850 A2 | 11/1996 |
| WO | WO 91/14326 | 9/1991 |

(Continued)

OTHER PUBLICATIONS

Schaefer, Ken, "IIS and Kerberos Part 5—Protocol Transition, Constrained Delegation, S4U2S and S4U2P," Jul. 18, 2007, 21 pages, http://www.adopenstatic.com/cs/blogs/ken/archive/2007/07/19/8460.aspx.

(Continued)

*Primary Examiner* — Dmitry H Levitan
(74) *Attorney, Agent, or Firm* — LeClairRyan, a Professional Corporation

(57) ABSTRACT

A system and method for reducing processing load on an encapsulated data packet transmitted over a virtual private network. The method includes handling an initial encapsulated data packet to be transmitted over an established VPN tunnel connection to a receiving device, the initial encapsulated data packet having a Layer 2 (L2) protocol header, an IP data packet and at least one framing element; removing the at least one framing element; removing the L2 protocol header; appending an alternate L2 encapsulated protocol header to the IP data packet to generate a modified encapsulated data packet, wherein the alternate header contains information of the IP data packet; and sending the modified encapsulated data packet to the receiving device, wherein the alternate encapsulated protocol header allows the receiving device to handle the IP data packet using less computational resources in comparison to receiving the initial encapsulated data packet.

18 Claims, 6 Drawing Sheets

(56) References Cited

U.S. PATENT DOCUMENTS

| | | | |
|---|---|---|---|
| 5,475,857 A | 12/1995 | Dally |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,663,018 A | 9/1997 | Cummings et al. |
| 5,752,023 A | 5/1998 | Choucri et al. |
| 5,761,484 A | 6/1998 | Agarwal et al. |
| 5,768,423 A | 6/1998 | Aref et al. |
| 5,774,660 A | 6/1998 | Brendel et al. |
| 5,790,554 A | 8/1998 | Pitcher et al. |
| 5,802,052 A | 9/1998 | Venkataraman |
| 5,812,550 A | 9/1998 | Sohn et al. |
| 5,825,772 A | 10/1998 | Dobbins et al. |
| 5,875,296 A | 2/1999 | Shi et al. |
| 5,892,914 A | 4/1999 | Pitts |
| 5,892,932 A | 4/1999 | Kim |
| 5,919,247 A | 7/1999 | Van Hoff et al. |
| 5,936,939 A | 8/1999 | Des Jardins et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 5,988,847 A | 11/1999 | McLaughlin et al. |
| 6,006,260 A | 12/1999 | Barrick, Jr. et al. |
| 6,006,264 A | 12/1999 | Colby et al. |
| 6,026,452 A | 2/2000 | Pitts |
| 6,028,857 A | 2/2000 | Poor |
| 6,051,169 A | 4/2000 | Brown et al. |
| 6,078,956 A | 6/2000 | Bryant et al. |
| 6,085,234 A | 7/2000 | Pitts et al. |
| 6,092,196 A | 7/2000 | Reiche |
| 6,108,703 A | 8/2000 | Leighton et al. |
| 6,111,876 A | 8/2000 | Frantz et al. |
| 6,128,279 A | 10/2000 | O'Neil et al. |
| 6,128,657 A | 10/2000 | Okanoya et al. |
| 6,170,022 B1 | 1/2001 | Linville et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,233,612 B1 | 5/2001 | Fruchtman et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,263,368 B1 | 7/2001 | Martin |
| 6,289,012 B1 | 9/2001 | Harrington et al. |
| 6,298,380 B1 | 10/2001 | Coile et al. |
| 6,327,622 B1 | 12/2001 | Jindal et al. |
| 6,343,324 B1 | 1/2002 | Hubis et al. |
| 6,347,339 B1 | 2/2002 | Morris et al. |
| 6,360,270 B1 | 3/2002 | Cherkasova et al. |
| 6,374,300 B2 | 4/2002 | Masters |
| 6,396,833 B1 | 5/2002 | Zhang et al. |
| 6,408,001 B1 * | 6/2002 | Chuah et al. ............... 370/392 |
| 6,430,562 B1 | 8/2002 | Kardos et al. |
| 6,434,081 B1 | 8/2002 | Johnson et al. |
| 6,484,261 B1 | 11/2002 | Wiegel |
| 6,490,624 B1 | 12/2002 | Sampson et al. |
| 6,510,135 B1 | 1/2003 | Almulhem et al. |
| 6,510,458 B1 | 1/2003 | Berstis et al. |
| 6,519,643 B1 | 2/2003 | Foulkes et al. |
| 6,601,084 B1 | 7/2003 | Bhaskaran et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,701 B2 | 11/2003 | Hatley |
| 6,683,873 B1 | 1/2004 | Kwok et al. |
| 6,691,165 B1 | 2/2004 | Bruck et al. |
| 6,708,187 B1 | 3/2004 | Shanumgam et al. |
| 6,742,045 B1 | 5/2004 | Albert et al. |
| 6,751,663 B1 | 6/2004 | Farrell et al. |
| 6,754,228 B1 | 6/2004 | Ludwig |
| 6,760,775 B1 | 7/2004 | Anerousis et al. |
| 6,772,219 B1 | 8/2004 | Shobatake |
| 6,779,039 B1 | 8/2004 | Bommareddy et al. |
| 6,781,986 B1 | 8/2004 | Sabaa et al. |
| 6,798,777 B1 | 9/2004 | Ferguson et al. |
| 6,816,901 B1 | 11/2004 | Sitaraman et al. |
| 6,829,238 B2 | 12/2004 | Tokuyo et al. |
| 6,847,645 B1 * | 1/2005 | Potter et al. ............... 370/392 |
| 6,868,082 B1 | 3/2005 | Allen, Jr. et al. |
| 6,876,629 B2 | 4/2005 | Beshai et al. |
| 6,876,654 B1 | 4/2005 | Hegde |
| 6,888,836 B1 | 5/2005 | Cherkasova |
| 6,928,082 B2 | 8/2005 | Liu et al. |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,975,592 B1 | 12/2005 | Seddigh et al. |
| 6,987,763 B2 | 1/2006 | Rochberger et al. |
| 7,007,092 B2 | 2/2006 | Peiffer |
| 7,113,993 B1 | 9/2006 | Cappiello et al. |
| 7,139,792 B1 | 11/2006 | Mishra et al. |
| 7,228,422 B2 | 6/2007 | Morioka et al. |
| 7,287,082 B1 | 10/2007 | O'Toole, Jr. |
| 7,308,703 B2 | 12/2007 | Wright et al. |
| 7,321,926 B1 | 1/2008 | Zhang et al. |
| 7,333,999 B1 | 2/2008 | Njemanze |
| 7,343,413 B2 | 3/2008 | Gilde et al. |
| 7,349,391 B2 | 3/2008 | Ben-Dor et al. |
| 7,454,480 B2 | 11/2008 | Labio et al. |
| 7,490,162 B1 | 2/2009 | Masters |
| 7,500,269 B2 | 3/2009 | Huotari et al. |
| 7,526,541 B2 | 4/2009 | Roese et al. |
| 7,558,197 B1 | 7/2009 | Sindhu et al. |
| 7,567,510 B2 * | 7/2009 | Gai et al. ............... 370/230 |
| 7,580,971 B1 | 8/2009 | Gollapudi et al. |
| 7,593,398 B2 * | 9/2009 | Booth et al. ............... 370/389 |
| 7,624,424 B2 | 11/2009 | Morita et al. |
| 7,801,978 B1 | 9/2010 | Susai et al. |
| 7,908,314 B2 | 3/2011 | Yamaguchi et al. |
| 8,130,650 B2 | 3/2012 | Allen, Jr. et al. |
| 8,380,854 B2 | 2/2013 | Szabo |
| 8,447,871 B1 | 5/2013 | Szabo |
| 8,472,438 B2 * | 6/2013 | Kini et al. ............... 370/389 |
| 2001/0023442 A1 | 9/2001 | Masters |
| 2002/0059428 A1 | 5/2002 | Susai et al. |
| 2002/0138615 A1 | 9/2002 | Schmeling |
| 2002/0161913 A1 | 10/2002 | Gonzalez et al. |
| 2002/0198993 A1 | 12/2002 | Cudd et al. |
| 2003/0046291 A1 | 3/2003 | Fascenda |
| 2003/0070069 A1 | 4/2003 | Belapurkar et al. |
| 2003/0086415 A1 | 5/2003 | Bernhard et al. |
| 2003/0108052 A1 | 6/2003 | Inoue et al. |
| 2003/0145062 A1 | 7/2003 | Sharma et al. |
| 2003/0145233 A1 | 7/2003 | Poletto et al. |
| 2003/0225485 A1 | 12/2003 | Fritz et al. |
| 2004/0022252 A1 * | 2/2004 | Jang et al. ............... 370/395.52 |
| 2004/0117493 A1 | 6/2004 | Bazot et al. |
| 2004/0267920 A1 | 12/2004 | Hydrie et al. |
| 2004/0268358 A1 | 12/2004 | Darling et al. |
| 2005/0004887 A1 | 1/2005 | Igakura et al. |
| 2005/0021736 A1 | 1/2005 | Carusi et al. |
| 2005/0044213 A1 | 2/2005 | Kobayashi et al. |
| 2005/0052440 A1 | 3/2005 | Kim et al. |
| 2005/0055435 A1 | 3/2005 | Gbadegesin et al. |
| 2005/0122977 A1 | 6/2005 | Lieberman |
| 2005/0154837 A1 | 7/2005 | Keohane et al. |
| 2005/0187866 A1 | 8/2005 | Lee |
| 2005/0262238 A1 | 11/2005 | Reeves et al. |
| 2006/0031520 A1 | 2/2006 | Bedekar et al. |
| 2006/0059267 A1 | 3/2006 | Cugi et al. |
| 2006/0156416 A1 | 7/2006 | Huotari et al. |
| 2006/0161577 A1 | 7/2006 | Kulkarni et al. |
| 2006/0171365 A1 | 8/2006 | Borella |

(56) References Cited

U.S. PATENT DOCUMENTS

| | | | |
|---|---|---|---|
| 2006/0182143 A1* | 8/2006 | Lu | 370/469 |
| 2006/0233106 A1 | 10/2006 | Achlioptas et al. | |
| 2006/0242300 A1 | 10/2006 | Yumoto et al. | |
| 2007/0016662 A1 | 1/2007 | Desai et al. | |
| 2007/0064661 A1 | 3/2007 | Sood et al. | |
| 2007/0083646 A1 | 4/2007 | Miller et al. | |
| 2007/0107048 A1 | 5/2007 | Halls et al. | |
| 2007/0118879 A1 | 5/2007 | Yeun | |
| 2007/0174491 A1 | 7/2007 | Still et al. | |
| 2007/0297551 A1 | 12/2007 | Choi | |
| 2008/0034136 A1 | 2/2008 | Ulenas | |
| 2008/0133518 A1 | 6/2008 | Kapoor et al. | |
| 2008/0134311 A1 | 6/2008 | Medvinsky et al. | |
| 2008/0148340 A1 | 6/2008 | Powell et al. | |
| 2008/0201599 A1 | 8/2008 | Ferraiolo et al. | |
| 2008/0256224 A1 | 10/2008 | Kaji et al. | |
| 2008/0301760 A1 | 12/2008 | Lim | |
| 2009/0049230 A1 | 2/2009 | Pandya | |
| 2009/0125625 A1 | 5/2009 | Shim et al. | |
| 2009/0138749 A1 | 5/2009 | Moll et al. | |
| 2009/0141729 A1* | 6/2009 | Fan | 370/401 |
| 2009/0141891 A1 | 6/2009 | Boyen et al. | |
| 2009/0228956 A1 | 9/2009 | He et al. | |
| 2009/0287935 A1 | 11/2009 | Aull et al. | |
| 2010/0023582 A1 | 1/2010 | Pedersen et al. | |
| 2010/0122091 A1 | 5/2010 | Huang et al. | |
| 2010/0150154 A1 | 6/2010 | Viger et al. | |
| 2010/0217882 A1* | 8/2010 | Yang | 709/229 |
| 2010/0242092 A1 | 9/2010 | Harris et al. | |
| 2010/0251330 A1 | 9/2010 | Kroeselberg et al. | |
| 2010/0325277 A1 | 12/2010 | Muthiah et al. | |
| 2011/0040889 A1 | 2/2011 | Garrett et al. | |
| 2011/0047620 A1 | 2/2011 | Mahaffey et al. | |
| 2011/0066718 A1 | 3/2011 | Susai et al. | |
| 2011/0173295 A1 | 7/2011 | Bakke et al. | |
| 2011/0282997 A1 | 11/2011 | Prince et al. | |
| 2011/0321122 A1 | 12/2011 | Mwangi et al. | |
| 2012/0005369 A1* | 1/2012 | Capone et al. | 709/236 |
| 2012/0066489 A1 | 3/2012 | Ozaki et al. | |

FOREIGN PATENT DOCUMENTS

| | | |
|---|---|---|
| WO | WO 95/05712 | 2/1995 |
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |
| WO | WO 99/64967 | 12/1999 |
| WO | WO 00/04422 | 1/2000 |
| WO | WO 00/04458 | 1/2000 |

OTHER PUBLICATIONS

Williams et al., "The Ultimate Windows Server 2003 System Administrator's Guide: Forwarding Authentication," 2003, 2 pages, Figure 10.7, Addison-Wesley Professional, Boston, Massachusetts.

"Windows Server 2003 Kerberos Extensions," Microsoft TechNet, 2003 (Updated Jul. 31, 2004), http://technet.microsoft.com/en-us/library/cc738207, Microsoft Corporation.

MacVittie, Lori, "Message-Based Load Balancing," Technical Brief, Jan. 2010, pp. 1-9, F5 Networks, Inc.

"A Process for Selective Routing of Servlet Content to Transcoding Modules," Research Disclosure 422124, Jun. 1999, pp. 889-890, IBM Corporation.

"BIG-IP Controller With Exclusive OneConnect Content Switching Feature Provides a Breakthrough System for Maximizing Server and Network Performance," F5 Networks, Inc,, Press Release, May 8, 2001, 2 pages.

Fielding et al., "Hypertext Transfer Protocol—HTTP/1.1," Network Working Group, RFC: 2068, Jan. 1997, pp. 1-162.

Fielding et al., "Hypertext Transfer Protocol—HTTP/1.1," Network Working Group, RFC: 2616, Jun. 1999, pp. 1-176, The Internet Society.

Floyd et al., "Random Early Detection Gateways for Congestion Avoidance," Aug. 1993, pp. 1-22, IEEE/ACM Transactions on Networking, California.

Hochmuth, Phil, "F5, CacheFlow pump up content-delivery lines," Network World Fusion, May 4, 2001, 1 page.

"Servlet/Applet/HTML Authentication Process With Single Sign-On," Research Disclosure 429128, Jan. 2000, pp. 163-164, IBM Corporation.

"Traffic Surges; Surge Queue; Netscaler Defense," 2005 PowerPoint Presentation, slides 1-12, Citrix Systems, Inc.

International Search Report for International Patent Application No. PCT/US2013/026615 (Jul. 4, 2013).

F5 Networks Inc., "Configuration Guide for Local Traffic Management", F5 Networks Inc., Jan. 2006, version 9.2.2, 406 pgs.

Abad, C., et al., "An Analysis on the Schemes for Detecting and Preventing ARP Cache Poisoning Attacks", IEEE, Computer Society, 27th International Conference on Distributed Computing Systems Workshops (ICDCSW'07), 2007, pp. 1-8.

OWASP, "Testing for Cross site scripting", OWASP Testing Guide v2, Table of Contents, Feb. 24, 2011, pp. 1-5, (www.owasp.org/index.php/Testing_for_Cross_site_scripting).

Crescendo Networks, "Application Layer Processing (ALP)," 2003-2009, pp. 168-186, Chapter 9, CN-5000E/5500E, Foxit Software Company.

* cited by examiner

SYSTEM AND METHOD FOR REDUCING CPU LOAD IN PROCESSING PPP PACKETS ON A SSL-VPN TUNNELING DEVICE

STATEMENT OF RELATED APPLICATION

The present application claims the benefit of priority based on U.S. Provisional Patent Application Ser. No. 61/383,700, filed on Sep. 16, 2010, in the name of Jonathan Chen, entitled "Method of Reducing CPU Load For Processing PPP Packets on a VPN Tunneling Device", all commonly owned herewith.

TECHNOLOGICAL FIELD

The present disclosure generally relates to improving network efficiency and in particular, to a system and method for reducing CPU load when processing encapsulated data packets in a SSL-VPN tunnel connection.

BACKGROUND

Secured Socket Layered Virtual Private Networks (SSL-VPN) are very popular in today's secure network deployments. The wide adoption and the ease of setup of Layer 2 (L2) protocols, such as the Point to Point Protocol (PPP), in all major OS platforms, allows SSL-VPN vendors to choose PPP as the underlying encapsulation protocol. In particular, the SSL-VPN application module running on client devices tunnels Layer 3 (L3) data packets using PPP in a data stream over a SSL connection terminated on the network traffic management device, where it acts as tunnel endpoints and forward L3 data packets to the network traffic management device.

The stream of encapsulated data packets implements a High Level Data Link Control (HDLC) framing mechanism (or other similar liming mechanism) which identities the beginning and the end of each frame in the transmitted data stream. Typically the endpoint device removes the HDLC-like framing from each PPP frame before injecting verified IP data packets into the network stack. This process of removing the HDLC-like framing from the data packets when they are received as well as applying the HDLC-like framing to the data packets when sending them back to the client device is expensive. This is because the endpoint device is required to process every byte within the boundaries of the frame to calculate checksum and escape characters that are part of Asynchronous Control Character Map (ACCM), as negotiated during the PPP LCP stage (RFC 1662).

This process results in a substantial bottleneck in throughput performance on the endpoint device. It is also wasteful as HDLC-like framing is not necessary considering that data integrity is maintained by the SSL layer in the tunnel connection, and the link is not a serial line. Unfortunately, in most cases, the local processor on the client device produces a stream of packets with HDLC-like framing, such that the endpoint device is forced into performing the above computationally-intense processes.

What is needed is a system, method and software which modifies the data stream by removing expensive overhead in the data stream while still using the PPP layer to maintain integrity of the SSL-VPN tunnel connection and allow efficient processing oldie modified data stream.

SUMMARY

In an aspect, a method of reducing processing load on a data packet transmitted over a virtual private network. The method comprises handling, at a network transmitting device, an initial encapsulated data packet to be transmitted over an established VPN tunnel connection to a receiving device. The initial encapsulated data packet includes a Layer 2 (L2) protocol header, an IP data packet and at least one framing element. The method comprises removing, at the network transmitting device, the at least one framing element and the L2 protocol header. The method comprises appending, at the network transmitting device, an alternate L2 encapsulated protocol header to the IP data packet to generate a modified encapsulated data packet. The alternate L2 encapsulated protocol header contains processing information of the IP data packet. The method comprises sending the modified encapsulated data packet to the receiving device over the VPN tunnel connection. The alternate L2 encapsulated protocol header is configured to allow the receiving device to handle the IP data packet in the modified encapsulated data packet by using less computational resources in comparison to receiving the initial encapsulated data packet.

In an aspect, a machine readable medium that has stored thereon instructions, comprises machine executable code which, when executed by at least one machine, causes the machine to handle an initial encapsulated data packet to be transmitted over an established VPN tunnel connection to a receiving device. The initial encapsulated data packet includes a Layer 2 (L2) protocol header, an IP data packet and at least one framing element. The code causes the machine to remove the at least one framing element and the L2 protocol header and then append an alternate L2 encapsulated protocol header to the IP data packet to generate a modified encapsulated data packet. The alternate L2 encapsulated protocol header contains processing information of the IP data packet. The code causes the machine to send the modified encapsulated data packet to the receiving device over the VPN tunnel connection. The alternate L2 encapsulated protocol header is configured to allow the receiving device to handle the IP data packet in the modified encapsulated data packet using less computational resources in comparison to receiving the initial encapsulated data packet.

In an aspect, a network device comprises a network interface configured to receive and transmit network data packets over a network. The network device includes a memory configured to store an application module having one or more programming instructions. The network device includes a processor configured to execute the application module. which causes the processor to handle an initial encapsulated data packet to be transmitted over an established VPN tunnel connection to a receiving device. The initial encapsulated data packet having a Layer 2 (L2) protocol header, an IP data packet and at least one framing element. The processor configured to remove the at least one framing element and remove the L2 protocol header. The processor configured to append an alternate L2 encapsulated protocol header to the IP data packet to generate a modified encapsulated data packet, wherein the alternate L2 encapsulated protocol header contains processing information of the IP data packet. The processor configured to send the modified encapsulated data packet to the receiving device over the VPN tunnel connection, wherein the alternate L2 encapsulated protocol header is configured to allow the receiving device to handle the IP data packet in the modified encapsulated data packet using less computational resources in comparison to receiving the initial encapsulated data packet.

In one or more of the above aspects, the at least one framing elements further comprises a front end frame delimiter, a checksum frame and/or a back end frame delimiter. In one or more of the above aspects, the L2 protocol is a PPP protocol.

In one or more of the above aspects, a conversion process is performed on one or more escape characters in the encapsulated data packet. In one or more of the above aspects, the network device is a client device or a network traffic management device.

Figure 1:
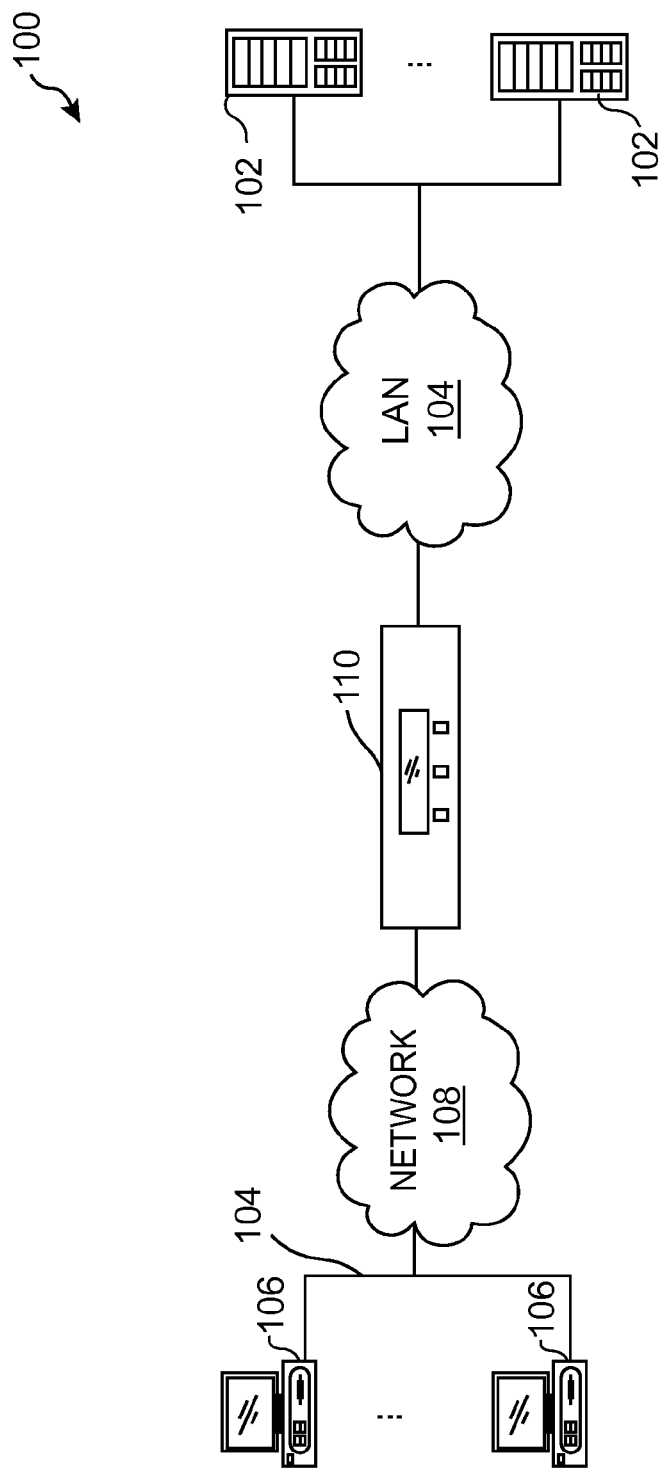
FIG. 1 is a diagram of an example system environment that improves network traffic performance over a VPN configuration in accordance with an aspect of the present disclosure.

While these examples are susceptible of embodiments in many different forms, there is shown in the drawings and will herein be described in detail preferred examples with the understanding that the present disclosure is to be considered as an exemplification and is not intended to limit the broad aspect to the embodiments illustrated.

DETAILED DESCRIPTION

FIG. 1 illustrates an example system environment 100 includes one or more network devices, such as one or more servers 102, one or more network traffic management devices 110 and one or more client devices 106. In an aspect, the one or more servers 102 operate in a secured network domain, whereby one or more client devices 106 can access the one or more servers 102 over a wide area network (WAN) 108 via a Virtual Private Network (VPN) tunnel. The VPN tunnel is implemented using VPN software which is operated in the client devices 106, the servers 102 as well as the network traffic management device 110. In particular, VPN software allows data to be transmitted and received among endpoint devices via an established VPN tunnel.

The network traffic management device 110 is coupled to the servers 102 via local area network (LAN) 104 and client devices 106 via network 108. In an aspect, requests in the form of data packets are sent from one or more client devices 106 to one or more servers 102 over a VPN tunnel. In particular, one or more network traffic management devices 110, which sit between the client device 106 and the server 102, receives and processes the requests, in the form of data packets, that are sent over the VPN tunnel from a transmitting network device (e.g. requesting client device 106) and sends them to a receiving network device (e.g. server 102). Similarly, responses in the form of data packets that are transmitted from a transmitting network device (e.g. responding server 102) over the VPN tunnel are received and processed by the network traffic management device 110, whereby the network traffic management device 110 sends the responses to the receiving network device (e.g. requesting client device 106). Additionally, as will be discussed in more detail below, the application module 210 on the client device 106 and network traffic management device 110 processes encapsulated data packets to be sent over the SSL-VPN tunnel and modifies the data packets with an alternative encapsulation protocol which allows the receiving network device (e.g. network traffic management device 110) to process the modified data packet in a manner that is less computationally intensive.

Client devices 106 comprise computing devices capable of connecting to other computing network devices, such as network traffic management device 110 and/or the servers 102 over a secured VPN tunnel connection. Such connections are performed over wired and/or wireless networks, such as network 108, to send and receive data, such as for Web-based and non Web-based requests, receiving responses to requests and/or performing other tasks, in accordance with the processes described below in connection with the present disclosure. Non-limiting and non-exhausting examples of such client devices include personal computers (e.g., desktops, laptops, tablets), mobile and/or smart phones, video and video game consoles, smart televisions, vehicles incorporating computers and the like.

In an example, client devices 106 can run Web browsers that may provide an interface for operators, such as human users, to interact with or to make requests for resources to different web server-based applications or Web pages via the network 108, although other server resources may be requested by clients. One or more Web-based applications may run on a web application enabled server 102 that provide the requested data back to one or more network devices, such as client devices 106. One or more of the client devices also include client side software which allows the client device 106 to connect to the secure network via the network traffic management device 110 using a VPN tunneling connection. Additionally, the network traffic management device 110 also implements software which allows it to process the data packets in the manner described in FIGS. 4 and 5 to reduce the computational load required to process the received data packets.

Network 108 comprises a publicly accessible network, such as the Internet. However, it is contemplated that the network 108 may comprise other types of private and public networks that include other devices. Communications, such as requests from client devices 106 and responses from servers 102, take place over the network 108 via an established VPN tunnel which utilizes a VPN enabled network protocol, such as the HTTP and TCP/IP protocols, for example. However, the principles discussed herein are not limited to this example and can include other protocols. Further, it should be appreciated that network 108 may include local area networks (LANs), wide area networks (WANs), direct connections and any combination thereof, as well as other types and numbers of network types. On an interconnected set of LANs or other networks, including those based on differing architectures and protocols, routers, switches, hubs, gateways, bridges, and other intermediate network devices may act as links within and between LANs and other networks to enable messages and other data to be sent from and to network devices.

Also, communication links within and between LANs and other networks typically include twisted wire pair (e.g.. Ethernet), coaxial cable, analog telephone lines, full or fractional dedicated digital lines including T1, T2, T3, and T4, Integrated Services Digital Networks (ISDNs), Digital Subscriber Lines (DSLs), wireless links including-satellite links and other communications links known to those skilled in the relevant arts. In essence, the network 108 includes any communication method by which data may travel between client devices 106, servers 102 and network traffic management device 110, and the like.

LAN 104 comprises a private local area network that includes the network traffic management device 110 coupled to the one or more servers 102, although the LAN 104 may comprise other types of private and public networks with other devices. Networks, including local area networks, besides being understood by those skilled in the relevant arts, have already been generally described above in connection with network 108 and thus will not be described further.

The one or more servers 102 comprise one or more server computing machines capable of operating one or more Web-based and/or non Web-based applications that may be accessed by other network devices. Such applications may provide data representing requested resources, such as particular Web page(s), image(s) of physical objects, and any other objects, responsive to the requests. It should be noted that the server 102 may perform other tasks and provide other types of resources. It is to be understood that the one or more servers 102 may comprise hardware and/or software, and/or may represent a system with multiple servers that may include internal or external networks. In this example, the servers 102 may be Web application servers such as Microsoft® IIS servers or Apache® servers, although other types of servers may be used. Further, additional servers may be coupled to the network 108 and many different types of applications may be available on servers coupled to the network 108.

It should be noted that while only two servers 102 are shown in the environment 100 depicted in FIG. 1, other numbers and types of servers may be coupled to the network traffic management device 110. It is also contemplated that one or more of the servers 102 may be a cluster of servers managed by the network traffic management device 110. It is also contemplated that the client devices 106 may connect to the servers 102 using a VPN connection without the use of the network traffic management device 110. Each of the servers 102 and client devices 106 may include one or more central processing units (CPUs), one or more computer readable media (i.e., memory), and interface systems that are coupled together by internal buses or other links as are generally known to those of ordinary skill in the art.

As per the TCP/IP protocols, requests from the requesting client devices 106 may be sent as one or more streams of data packets over network 108 to the network traffic management device 110 and/or the servers 102 over the established VPN tunnel connection. Such protocols can establish connections, send and receive data for existing connections, and the like.

As shown in the example environment 100 depicted in FIG. 1, the network traffic management device 110 is interposed between client devices 106 and the servers 102. Again, the environment 100 could be arranged in other manners with other numbers and types of devices. Also, the network traffic management device 110 is coupled to network 108 by one or more. network communication links and intermediate network devices (e.g. routers, switches, gateways, hubs and the like) (not shown). In an aspect, the environment 100 does not utilize the network traffic management device 110. It should he understood that the devices and the particular configuration shown in FIG. 1 are provided for exemplary purposes only and thus are not limiting.

Generally, the network traffic management device 110 manages network communications, which may include one or more client requests and server responses, via the network 108 between one or more client devices 106 and one or more of the servers 102. These requests may be destined for one or more servers 102, and may take the form of one or more TCP/IP data packets.. In an aspect, the requests pass through one or more intermediate network devices and/or intermediate networks, until they ultimately reach the traffic management device 110. In any case, the network traffic management device 110 may manage the network communications by performing several network traffic related functions involving the communications. Additionally, the network traffic management device 110 may perform such functions including, but not limited to, load balancing, access control, and the like.

Figure 2:
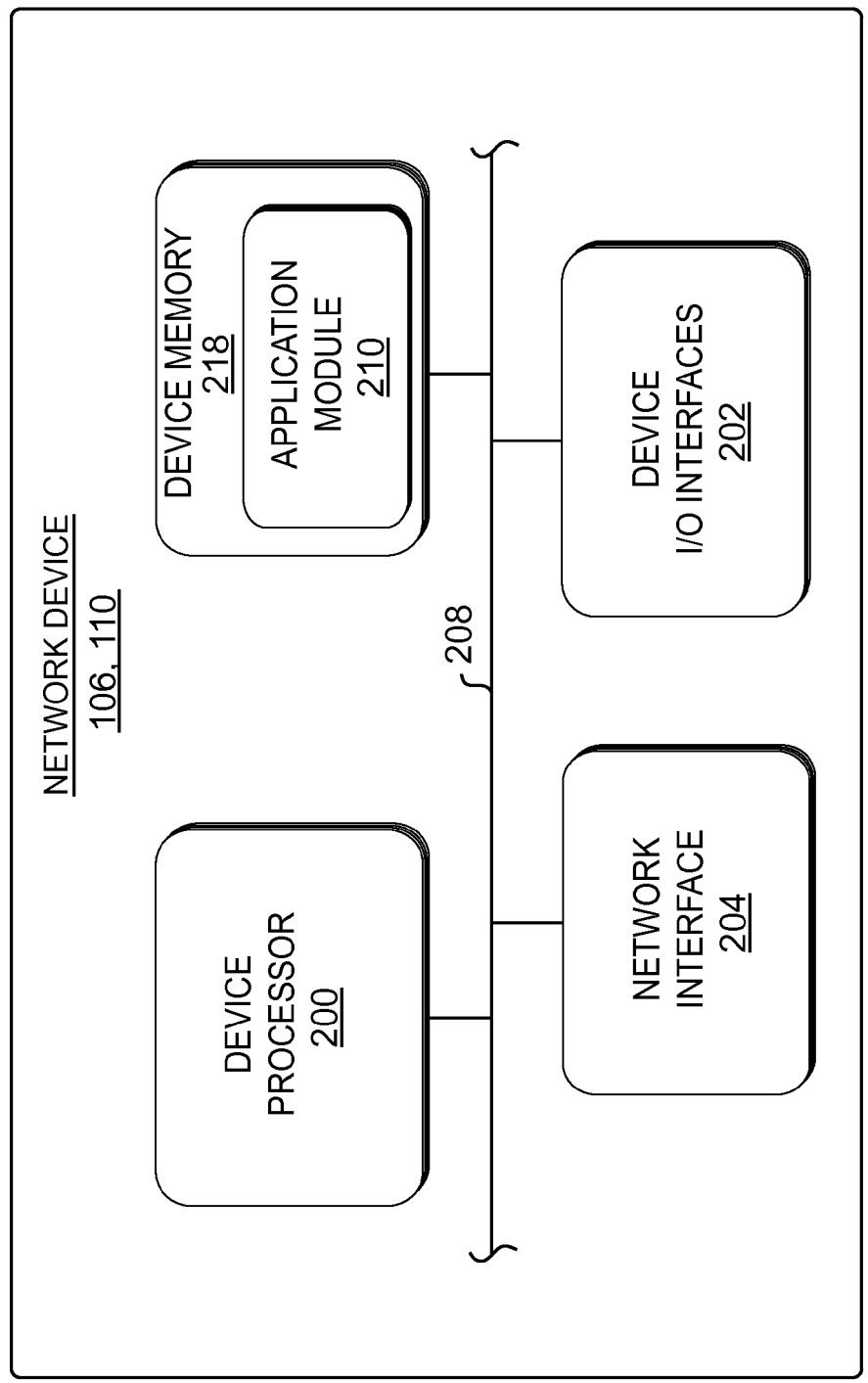
FIG. 2 is a block diagram of a network traffic management device shown in FIG. 1 in accordance with an aspect of the present disclosure.

FIG. 2 is a block diagram of a network device shown in FIG. 1 in accordance with an aspect of the present disclosure. As shown in FIG. 2, the network device may be a client device 106 and/or a network traffic management device 110 which includes one or more local device processors 200, one or more device I/O interfaces 202, one or more network interface 204, and one or more device memories 218 coupled together by bus 208. It should be noted that the network device 106, 110 could include other types and numbers of components. In addition, as shown in FIG. 2, the network device 106, 110 includes a software-based application module 210 which is stored in the memory 218, whereby the processor 200 implements the application module 210 to perform the processes with regard to the data packets, as described in FIGS. 4A, 4B and 5.

Device processor 200 comprises one or more microprocessors configured to execute computer/machine readable and executable instructions, such as the application module 210, stored in device memory 218. It is understood that the processor 200 may comprise other types and/or combinations of processors, such as digital signal processors, micro-controllers, application specific integrated circuits ("ASICs"), programmable logic devices ("PLDs"), field programmable logic devices ("FPLDs"), field programmable gate arrays ("FPGAs"), and the like, The processor is programmed or configured according to the teachings as described and illustrated in the present disclosure.

Device I/O interfaces 202 comprise one or more user input and output device interface mechanisms. The interface may include a computer keyboard, touchscreen, mouse, display device, and the corresponding physical ports and underlying supporting hardware and software to enable the network device 106, 110 to communicate with the outside environment. Such communication may include accepting user data input and to provide user output, although other types and numbers of user input and output devices may be used. Additionally or alternatively, as will he described in connection with network interface 204 below, the network device 106, 110 may communicate with the outside environment for certain types of operations (e.g., configuration) via one or more network management ports.

Network interface 204 comprises one or more mechanisms that enable the network device 106, 110 to engage in TCP/IP communications over VPN connections via the LAN 104 and the network 108. However, it is contemplated that the network interface 204 may be constructed for use with other communication protocols and types of networks. In an aspect, the network interface 204, enabled by software, is able to transmit and receive of data packets, data streams, and/or datagrams that are sent over the VPN tunnel connection. Network interface 204 is sometimes referred to as a transceiver, transceiving device, or network interface card (NIC), which transmits and receives network data packets to one or more networks, such as LAN 104 and network 108. In an example where the network device 106, 110 includes more than one device processor 200 (or a processor 200 has more than one core), each processor 200 (and/or core) may use the same single network interface 204 or a plurality of network interfaces 204. Further, the network interface 204 may include one or more physical ports, such as Ethernet ports, to couple the network device 106, 110 with other network devices, such as servers 102. Moreover, the network interface 204 may include certain physical ports dedicated to receiving and/or transmitting certain types of network data, such as device management related data for configuring the network device 106, 110.

Bus 208 may comprise one or more internal device component communication buses, links, bridges and supporting components, such as bus controllers and/or arbiters. The bus enable the various components of the network device 106, 110, such as the processor 200, device I/O interfaces 202, network interface 204, and device memory 218, to communicate with one another. however, it is contemplated that the bus may enable one or more components of the client device 106 to communicate with components in other network devices as well. Example buses include HyperTransport, PCI, PCI Express, InfiniBand, USB, Firewire, Serial ATA (SATA), SCSI, IDE and AGP buses. However, it is contemplated that other types and numbers of buses may be used, whereby the particular types and arrangement abuses will depend on the particular configuration of the network device 106, 110.

Device memory 218 comprises non-transitory computer readable media, namely computer readable or processor readable storage media, which are examples of machine-readable storage media. Computer readable storage/machine-readable storage media may include volatile, nonvolatile, removable, and non-removable media implemented in any method or technology for storage of information. Such storage media contains computer readable/machine-executable instructions, data structures, program modules, or other data, which may be obtained and/or executed by one or more processors, such as device processor 200. Such instructions allow the processor to perform actions, including implementing an operating system for controlling the general. operation of the network device 106, 110 to perform one or more portions of the process described herein.

Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other medium which can be used to store the desired information. Such desired information includes data and/or computer/machine-executable instructions and which can be accessed by a computing or specially programmed device, such as network device 106, 110.

Figure 4A:
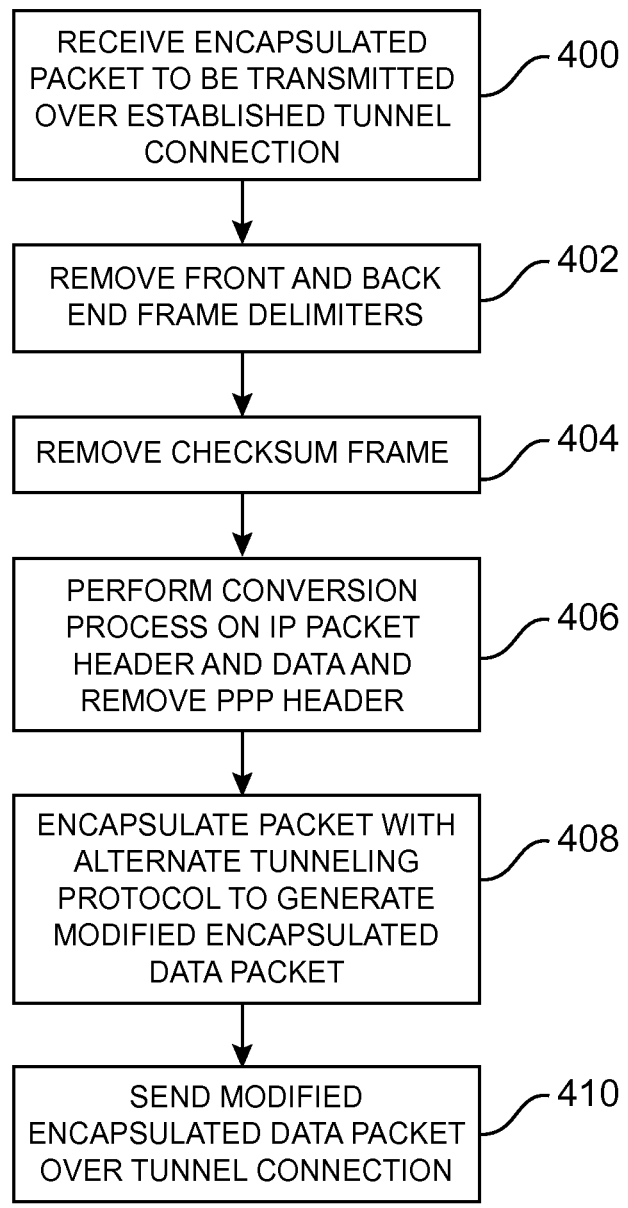
FIGS. 4A and 4B illustrate flow processes of handling and transmitting encapsulated data packets in accordance with an aspect of the present disclosure.
Figure 4B:
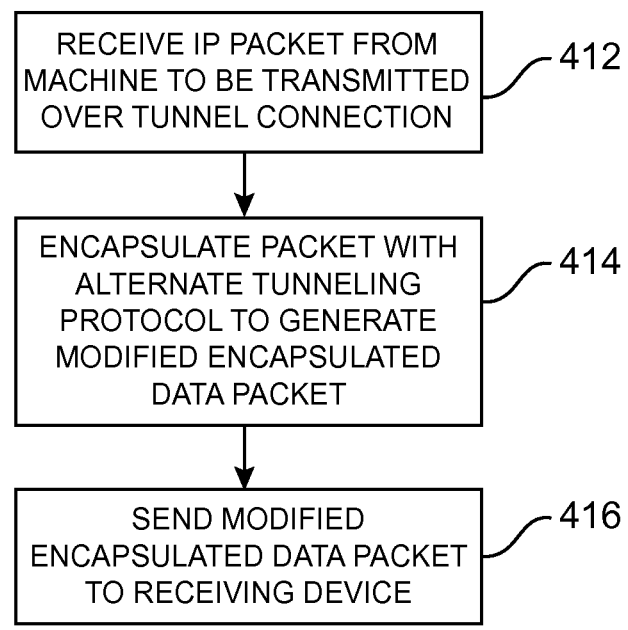
Figure 5:
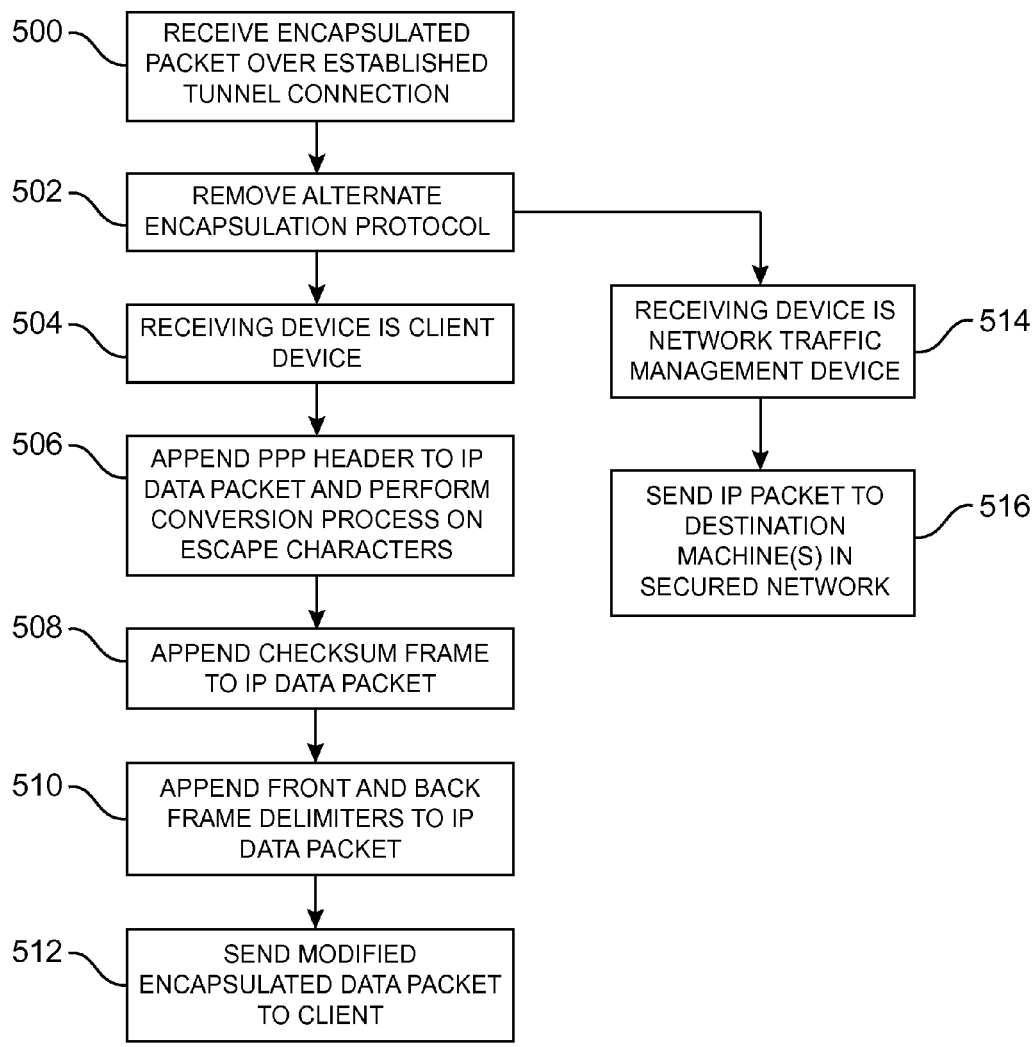
FIG. 5 illustrates a flow process of receiving and handling modified encapsulated data packets in accordance with an aspect of the present disclosure.

The software based application module 210 shown in FIG. 2 performs the processes described in relation to FIGS. 4A, 4B and 5. It should be noted that although the application module 210 is shown within the memory 218, it is contemplated that the application module 210 may be elsewhere inside or exterior to the network device 106, 110. The application module 210 contains computer readable instructions which, when executed by one or more processors 200, causes the processor 200 on the network device to perform the processes described in FIGS. 4A, 4B and 5.

Figure 3A:
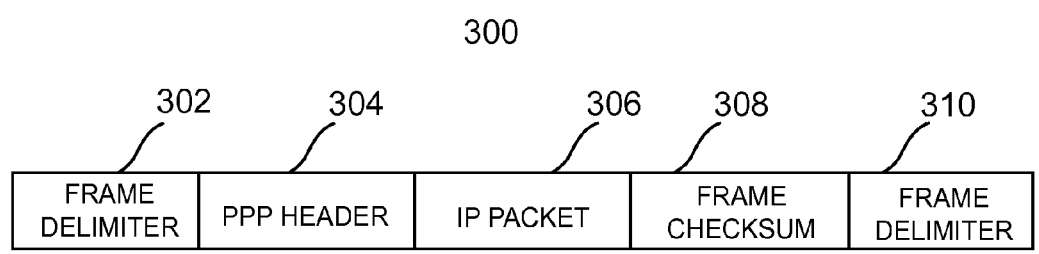
FIG. 3A is a schematic of a frame enabled data packet encapsulated in accordance with an aspect of the present disclosure.

FIG. 3A illustrates a framed data packet encapsulated with a Layer 2 (L2) PPP protocol that is to be sent in a data stream from a network transmitting device to a network receiving device over an established SSL tunnel connection in accordance with an aspect of the present disclosure.

For purposes of the present disclosure, a transmitting network device (also referred to as transmitting device) is a network device that transmits one or more data packets over a SSL tunnel connection to a receiving network device (also referred to as receiving device). In an aspect, the transmitting network device can he the client device 106 and the receiving network device can be the network traffic management device 110 depending on the direction of the data flow. In this example aspect, the client device 106, which executes the application module 210, modifies one or more IP packets and transmits the one or more modified IP packets over the SSL tunnel to network traffic management device 110. In this example aspect, the network traffic management device 110, which executes the application module 210, receives and processes the modified IP packets.

In another aspect, the transmitting network device can be the network traffic management device 110 and the receiving network device can be the client device 106 depending on the direction of the data flow. In this example aspect, the network traffic management device 110, which executes the application module 210, modifies one or more IP packets and transmits the one or more modified IP packets over the SSL tunnel. In this example aspect, the client device 106, which executes the application module 210, receives and processes the modified IP packets.

As shown in FIG. 3A, in sending a request over a VPN tunnel connection, the operating system of the transmitting device encapsulates and transmits framed data packets 300 comprising a front end frame delimiter 302, a PPP header 304, an IP packet containing payload data 306 (e.g. datagram), a checksum frame 308 and a back end frame delimiter 310 for transmission over the established SSL tunnel connection. In an aspect, the PPP header 304 may contain information such as datagram size, escape characters and the like. It should be noted that the specific configuration of the encapsulated data packet is an example, and additional and/or other components are contemplated. In an aspect, the PPP header 304 is described herein as the L2 protocol, however other L2 protocols which function in a similar manner to the PPP protocol arc contemplated.

Figure 3B:
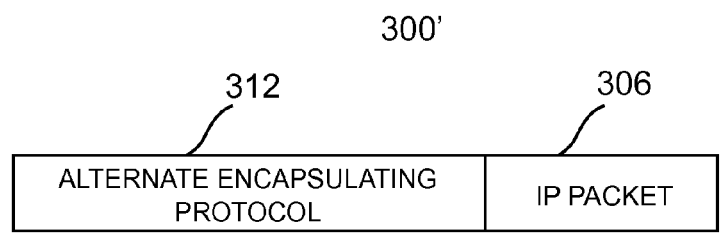
FIG. 3B is a schematic of a modified encapsulated data packet for transmission over the tunnel connection in accordance with an aspect of the present disclosure.

As stated above, the framed data packet 300 in FIG. 3A includes properties associated with HDLC-like framing techniques which typically require the receiving device to perform a substantial amount of processing overhead. To minimize the amount of processing overhead that the receiving device must utilize, the application module 210 of the transmitting device processes and modifies the encapsulated data packet with an alternate encapsulation protocol 312 (FIG. 3B). These modified data packets allow the receiving device to process the packets in an optimal and less-computationally intensive manner.

In particular, the operating system of the client device performs standard encapsulation techniques to create the encapsulated data packet 300 shown in FIG. 3A. Prior to the encapsulated data packet 300 being sent from the transmitting device, the application module 210 buffers the encapsulated packet 300 to the IP packet 306 that contains the payload data. The application module 210 thereafter modifies the packet 300 by removing the front end frame delimiter 302, the PPP protocol header 304, the checksum frame 308 and the back end frame delimiter 310 from the packet 300, thereby leaving only the IP packet 306.

In an aspect, the application module 210 of the transmitting device then prepends or inserts an alternate encapsulation protocol 312 to the IP data packet 306 to generate a modified encapsulated data packet 300', as shown in FIG. 3B. In particular, the alternate encapsulation protocol 312 implemented by the application module 210 is configured to contain header information which contains the payload length of the IP data packet 306. This payload length information effectively substitutes the functions of the frame delimiters 302, 310 of the received encapsulated data packet 300 (FIG. 3A). The modified encapsulated packet 300' is then sent from the transmitting device over the established SSL VPN tunnel connection to the receiving device. Considering that the VPN tunnel connection is a SSL based connection, adequate security and reliability inherent in the SSL protocol ensures that the modified data packets are not lost during transmission over the VPN tunnel between the transmitting device and the receiving device.

The receiving device also implements the application module 210 which is configured to understand the alternate encapsulation protocol 312 is thus able to retrieve the IP packet 306 by simply processing the information in the alternate encapsulation protocol 312. In particular, the receiving device reads the header information in the alternate encapsulation protocol 312 and, using the header information, is able to read the IP data packet 306 and its payload data without processing any other frames that are typically enclosed in a HDLC-like framed encapsulated data packets. This results in the receiving device being able to process and read the IP packet 306 using less computing resources in comparison to computing resources that are typically needed to process and read HDLC-framed encapsulated data packets. Another advantage is that the PPP protocol is utilized to route VPN traffic between the transmitting and receiving devices without requiring the receiving device to process all the overhead that is inherent in the PPP protocol and its the framing components.

In an aspect, the header in the alternate encapsulation protocol 312 may he encoded to have a Length-Type-Value (LTV) element. In such an aspect, the LTV element would have a Type component, such as a numeric code which indicates the kind of field that the message of the IP packet 306 represents. The LTV element also has a Length component which represents the size of the value field (typically in bytes) of the IP packet 306. The LTV clement may include a Value component which represents a variable sized set of bytes which contains data identifying the type of information in the IP data packet 306 and its payload data. Some of the advantages of using a TLV representation arc that such sequences are easily searchable using generalized parsing functions. Additionally, TLV elements are typically in a binary format which results in a smaller amount of data that needs to processed by the application module 210 of the receiving device. The TLV elements also make parsing of data to be performed quicker by the application module 210 of the receiving device. Although a LTV element is described, any other alternate encapsulating protocol may he utilized which is lighter in overhead compared to the PPP based, framed encapsulated packet. It is also desired that the alternate encapsulating protocol can be configured to support further optimization techniques that can be performed by the application module 210.

In an aspect, the application module 210 performs a conversion process on the escaped characters in the received encapsulated data packet 300 (FIG. 3A), whereby the application module 210 identifies the escaped characters and converts them back to their default values. In an aspect, the converted escaped characters may be contained in the alternate encapsulating protocol 312, such that the receiving device will only read the needed values to process the modified encapsulated data packet 300'. This results in the receiving device not having to read every byte representative of escaped characters when processing the modified encapsulated data packet 300'.

FIG. 4A illustrates a flow chart of a process implemented by the application module 210 on the transmitting device in accordance with an aspect of the present disclosure. As shown in FIG. 4A, the application module 210 on the transmitting device receives the encapsulated data packet 300 from the operating system of the transmitting device, whereby the transmitting device is in communication with one or more receiving devices over an already established SSL VPN tunnel connection (block 400). The processor 200 on the transmitting device, upon executing the application module 210, removes the front and back end frame delimiters 302, 310 from the encapsulated packet 300 (block 402). The processor 200 on the transmitting device, executing the application module 210, also removes one or more checksum frames 308 of the encapsulated packet 300 (block 404). By removing the frame delimiters 302, 310 as well as the checksum frames 308, a substantial amount of processing overhead is removed from the encapsulated packet 300 and thus will not need to he processed by the receiving device.

The processor 200, implementing the application module 210, performs a conversion process on one or more escape characters in the encapsulated data packet 300, whereby the escape character(s) are removed and/or converted to their default values (block 406). The conversion process as well as removal of the PPP header 304 strips the encapsulated data packet 300 of the overhead not needed by the receiving device to he able to read necessary portions of the IP data packet 306. However, as stated above, since the PPP protocol is utilized in establishing the VPN tunnel connection between the transmitting and receiving devices all data packets are still able to he sent securely through the VPN tunnel connection without being lost.

Alter the frame delimiters 302, 310, PPP header 304 and the frame checksum 308 are removed, the processor 200, implementing the application module 210, encapsulates the core IP data packet 306 with an alternate encapsulation protocol component 312 to generate a modified encapsulated data packet 300' (block 408). The application module 210 of the transmitting device then sends the modified encapsulated data packet 300' to the destination receiving device (block 410). As discussed above, the alternate encapsulation protocol 312 generated by the application module 210 includes a header having necessary information to allow the receiving device to read and process the IP packet 306 in the modified encapsulated data packet 300'.

In the aspect that the data flow is in the direction where the client device 106 is the transmitting network device and the network traffic management device 110, the process performed by the application module 210 in FIG. 4A occurs at the client device 106.

However, if the data flow is in the reverse direction where the network traffic management device 110 is the transmitting network device and the client device 106 is the receiving network device. the process performed by the application module 210 in FIG. 4B occurs at the network traffic management device 110. As shown in FIG. 4B, the network traffic management device 110 receives data packets in the form of IP packets 306 from one or more machines in the secured network that are to be sent back to the client device 106 over the established tunnel connection (block 412). The application module 210 of the network traffic management device 110 thereafter encapsulates the IP packet 306 with the alternate encapsulation protocol (block 414). The network traffic management device 110 thereafter sends the modified encapsulated packet 300' to the client device 106 via the established SSL VPN connection (block 416).

FIG. 5 illustrates a flow process of receiving modified encapsulated data packets in accordance with an aspect of the present disclosure. In an aspect, the receiving device receives the modified encapsulated data packet 300' (FIG. 3B), whereby the data packet 300' contains the IP packet 306 along with the alternate encapsulating protocol 312 (block 500).

Upon receiving the modified encapsulated data packet 300', the processor 200, implementing the application module 210, removes the alternate encapsulation protocol component 312 (block 502). In an example aspect that the receiving device is the network traffic management device 110, as shown in block 514, the network traffic management device 110 will send the IP packet 306 to one or more destination machines in the secured network (block 516).

However, if the receiving device is the client device 106 (block 504), the application module 210 of the client device 106, appends the PPP header 304 to the core IP data packet 306 (block 506). The application module 210 then appends the frame checksum 308 to the core IP data packet 306 (block 508) and then inserts the front and back frame delimiters 302, 310 (block 510). In an aspect, the application module 210 also inserts and/or converts any escape characters back to their original values and inserts any additional information to allow proper routing of the encapsulated data packet 300. Thereafter, the encapsulated data packet 300 is transmitted from the application module 210 to the operating system of the client device 106 for handling of the data packet 300 (block 512).

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to he suggested hereby, and are within the spirit and scope of the examples. Additionally, the recited order of processing elements or sequences, or the use of numbers, letters, or other designations therefore, is not intended to limit the claimed processes to any order except as may be specified in the claims.

What is claimed is:

1. A method of reducing processing required to transmit a data packet over a virtual private network, the method comprising:
    receiving, at a network transmitting device, an initial encapsulated data packet to be transmitted over an established Virtual Private Network (VPN) tunnel connection to a receiving device;
    removing, at the network transmitting device, from the initial encapsulated data packet, a Layer 2 (L2) protocol header and at least one framing element selected from a front end delimiter or a back end delimiter;
    appending, at the network transmitting device, an alternate encapsulated protocol header to an Internet Protocol (IP) data packet of the initial encapsulated data packet to generate a modified encapsulated data packet, wherein the alternate encapsulated protocol header contains processing information for the IP data packet, the processing information comprising at least a payload length of the IP data packet; and
    sending, with the network transmitting device, the modified encapsulated data packet to the receiving device over the VPN tunnel connection, wherein the alternate encapsulated protocol header is configured to allow the receiving device to handle the IP data packet in the modified encapsulated data packet using less computational resources in comparison to handling the initial encapsulated data packet.

2. The method of claim 1, wherein the encapsulated protocol header further comprises one or more components selected from a type component, a length component, or a value component.

3. The method of claim 2, wherein the one or more components comprise a Length-Type-Value (LTV) element and the LTV element is in a binary format.

4. The method of claim 2, wherein the type component indicates a type of field of a message represented by the IP data packet, the length component indicates a size of a value field of the IP data packet, and the value component indicates a set of bytes that contain data identifying a type of information included in the IP data packet.

5. The method of claim 1, wherein the at least one framing element is further selected from a checksum frame.

6. The method of claim 1, wherein the L2 protocol is a Point-to-Point (PPP) protocol.

7. A non-transitory machine readable medium having stored thereon instructions for reducing processing required to transmit a data packet over a virtual private network, the medium comprising machine executable code which when executed by at least one machine, causes the machine to:
    receive an initial encapsulated data packet to be transmitted over an established Virtual Private Network (VPN) tunnel connection to a receiving device;
    remove from the initial encapsulated data packet, a Layer 2 (L2) protocol header and at least one framing element selected from a front end delimiter or a back end delimiter;
    append an alternate encapsulated protocol header to an Internet Protocol (IP) data packet of the initial encapsulated data packet to generate a modified encapsulated data packet, wherein the alternate encapsulated protocol header contains processing information for the IP data packet, the processing information comprising at least a payload length of the IP data packet; and
    send the modified encapsulated data packet to the receiving device over the VPN tunnel connection, wherein the alternate encapsulated protocol header is configured to allow the receiving device to handle the IP data packet in the modified encapsulated data packet using less computational resources in comparison to handling the initial encapsulated data packet.

8. The machine readable medium of claim 7, wherein the encapsulated protocol header further comprises one or more components selected from a type component, a length component, or a value component.

9. The machine readable medium of claim 8, wherein the one or more components comprise a Length-Type-Value (LTV) element and the LTV element is in a binary format.

10. The machine readable medium of claim 8, wherein the type component indicates a type of field of a message represented by the IP data packet, the length component indicates a size of a value field of the IP data packet, and the value component indicates a set of bytes that contain data identifying a type of information included in the IP data packet.

11. The machine readable medium of claim 7, wherein the at least one framing element is further selected from a checksum frame.

12. The machine readable medium of claim 7, wherein the L2 protocol is a Point-to-Point (PPP) protocol.

13. A network device comprising:
    a memory storing an application module having one or more programming instructions; and a processor configured execute the application module, which when executed by the processor, causes the processor to:

receive an initial encapsulated data packet to be transmitted over an established Virtual Private Network (VPN) tunnel connection to a receiving device;

remove from the initial encapsulated data packet, a Layer 2 (L2) protocol header and at least one framing element selected from a front end delimiter or a back end delimiter;

append an alternate encapsulated protocol header to an Internet Protocol (IP) data packet of the initial encapsulated data packet to generate a modified encapsulated data packet, wherein the alternate encapsulated protocol header contains processing information for the IP data packet, the processing information comprising at least a payload length of the IP data packet; and send the modified encapsulated data packet to the receiving device over the VPN tunnel connection, wherein the alternate encapsulated protocol header is configured to allow the receiving device to handle the IP data packet in the modified encapsulated data packet using less computational resources in comparison to handling the initial encapsulated data packet.

14. The network device of claim 13, wherein the encapsulated protocol header further comprises one or more components selected from a type component, a length component, or a value component.

15. The network device of claim 14, wherein the one or more components comprise a Length-Type-Value (LTV) element and the LTV element is in a binary format.

16. The network device of claim 14, wherein the type component indicates a type of field of a message represented by the IP data packet, the length component indicates a size of a value field of the IP data packet, and the value component indicates a set of bytes that contain data identifying a type of information included in the IP data packet.

17. The network device of claim 13, wherein the at least one framing element is further selected from a checksum frame.

18. The network device of claim 13, wherein the L2 protocol is a Point-to-Point (PPP) protocol.

* * * * *